United States Patent [19]

Derossi

[11] 4,275,604

[45] Jun. 30, 1981

[54] DEVICE FOR THE LEVELING OF THE GYROSCOPIC AXIS OF A COMPASS WITH A MECHANICAL SUSPENSION AND AN ANTIPENDULAR-TORQUE PRECESSION SYSTEM

[76] Inventor: Piero M. Derossi, Corso Giovanni Lanza 55, Torino, Italy

[21] Appl. No.: 973,812

[22] Filed: Dec. 28, 1978

[30] Foreign Application Priority Data

Dec. 30, 1977 [IT] Italy .................. 69956 A/77

[51] Int. Cl.³ .................. G01C 19/26; G01C 19/30; G01C 19/38
[52] U.S. Cl. .................. 74/5.12; 33/324; 74/5.44; 74/5.9
[58] Field of Search .................. 74/5.12, 5.1, 5.44, 74/5.9; 33/324

[56] References Cited

U.S. PATENT DOCUMENTS

| | | | |
|---|---|---|---|
| 1,309,637 | 7/1919 | Klahn | 74/5.44 X |
| 1,586,525 | 6/1926 | Henry | 74/5.44 |
| 2,441,157 | 5/1948 | Kissel | 74/5.1 |
| 2,556,253 | 6/1951 | Blair et al. | 74/5.1 X |
| 2,729,978 | 1/1956 | Judson | 74/5.1 |
| 3,292,269 | 12/1966 | Brugger | 74/5.1 X |

*Primary Examiner*—Rodney H. Bonck
*Attorney, Agent, or Firm*—Montague & Ross

[57] ABSTRACT

A gyrocompass with a tilt ring pivotable about a substantially horizontal axis has a U-frame swingable about that axis which forms part of a pendular system and carries a coupling lever engageable with projections on the lower end of the U-frame to immobilize the latter with respect to the tilt ring when the instrument is inactive, in order to hold a gyroscope axis perpendicular to the tilt-ring axis in a horizontal position. An antipendular system, comprising a liquid-filled U-tube swingable about the gyroscope axis, is overridden by the pendular system in the engaged position of the coupling lever but becomes effective upon disengagement thereof to let the gyroscope mechanism carry out necessary precession movements.

7 Claims, 7 Drawing Figures

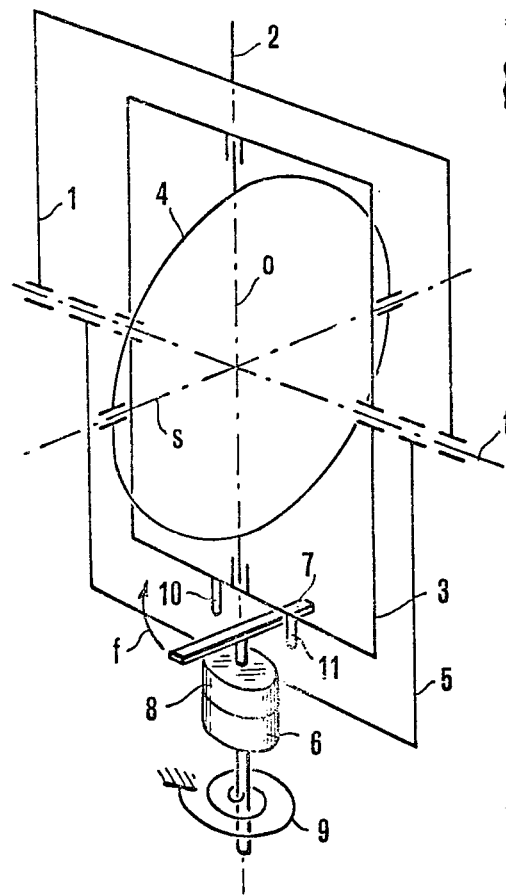
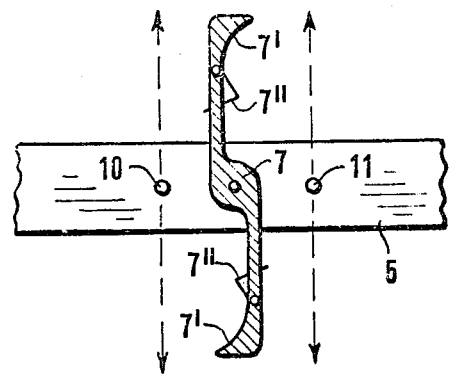
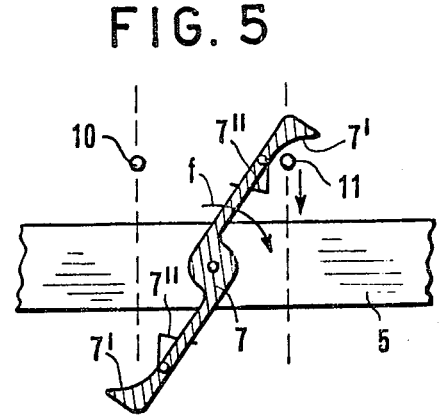
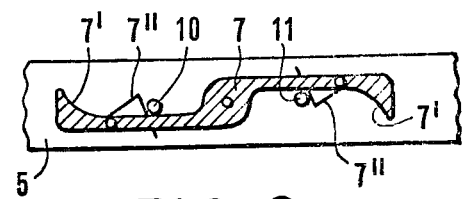
FIG. 1
FIG. 4
FIG. 5
FIG. 6

DEVICE FOR THE LEVELING OF THE GYROSCOPIC AXIS OF A COMPASS WITH A MECHANICAL SUSPENSION AND AN ANTIPENDULAR-TORQUE PRECESSION SYSTEM

FIELD OF THE INVENTION

The present invention relates to a device designed to assure that the gyroscopic axis of a compass with mechanical suspension, provided with an antipendular-torque precession system, lies substantially in a horizontal plane when the compass is put into service after a period of inactivity.

BACKGROUND OF THE INVENTION

As is known, the effect of spontaneous orientation of a gyroscopic compass is achieved by elastically forcing the gyroscopic axis to lie in a horizontal plane, and this may be obtained by a pendular or an antipendular system. The use of such an antipendular system is advantageous because it eliminates or attenuates the disturbances affecting the behavior of the compass due to the accelerations of the vehicle on which it is installed, but it presents the drawback of being intrinsically unstable and therefore of causing, when the gyroscope is inactive, a departure of the gyroscopic axis from its normal horizontal attitude. If not corrected, this phenomenon leads to a great lengthening of the activation times of the compass, and thus of the period of time needed for the spontaneous positioning of the gyroscopic axis, with the gyroscope activated, in a horizontal plane and with the correct orientation therein.

In order to reduce these activation times, recourse is usually had to the installation of an inclination detector, such as an accelerometer or an electrolytic level, located with its longitudinal axis parallel to the spin axis (i.e. the axis of rotation of the gyroscopic mass) of the gyroscope, so as to detect any rotation around the tilt axis, and thus any displacement of the gyroscope axis with respect to the horizontal plane. The signal of this inclination detector is then amplified and used to pilot a correcting device, such as a linear torque generator placed on the tilt ring and juxtaposed with the gyrosphere shell, capable of applying to the gyroscope a torque around the azimuth axis, so as to cause a precession around the tilt axis until the achievement of the leveled horizontal position. A system of this kind is rather complex and expensive and is subject to malfunction due to the use of sophisticated components delicate to install.

OBJECT OF THE INVENTION

The object of the present invention is to realize a device which shortens the activation time of a gyrocompass by assuring, upon its activation, that the gyroscopic axis is already substantially located in a horizontal plane, and this with only the use of mechanical and electromagnetic means which are sturdy, inexpensive and designed to present the greatest reliability.

SUMMARY OF THE INVENTION

I achieve this object, in accordance with my present invention, by providing a pendular system having a predominating effect with respect to that of the antipendular-torque precession system and means forming a releasable coupling between the pendular system and the tilt ring supporting the gyrosphere, the coupling means being designed to consolidate the pendular system and the tilt ring at least during periods of standstill of the gyroscope but leave these parts independent of each other at least during the periods of normal operation of the gyrocompass.

In this way, when the gyroscope is stopped, the pendular system predominating over the antipendular system serves to maintain the gyroscopic axis substantially horizontal, whereas when the compass is in normal operation, the pendular system does not disturb the action of the antipendular precession system. Since, when the gyroscope is activated, the same lies substantially in a horizontal plane, the activation time is suitably shortened.

Upon activation, the coupling means is preferably left in the active state until the gyroscope, whose rotational motion gradually accelerates in this phase, has reached a speed sufficient to produce a gyroscopic effect capable of supporting the torque applied by the antipendular system. I prefer to design the coupling means in such a way that, in its active state, it reverses any relative offset which at that moment may exist between the tilt ring and the pendular system.

The pendular system is preferably constituted by a mass integral with a fork pivoted on the supporting fork of the gyrocompass along the same pivotal axis of the tilt ring.

The coupling means may advantageously be realized in the form of a rocking lever mounted on the pendular fork, cooperating with protrusions presented by the tilt ring and so shaped as to cause an alignment of the parts when it comes into engagement with these protrusions. The rocking lever may advantageously be actuated by a rotating magnet.

I further prefer to provide the rocking lever with elements, such as springs, adapted to prevent the protrusions of the tilt ring from disengaging themselves from the rocking lever under the action of accidental stresses. This assures, under all circumstances, that the tilt axis cannot become excessively inclined with respect to the horizontal, and therefore it allows the elimination of the mechanism for mechanical blocking (caging) normally necessary in this kind of gyrocompass.

Finally, the actuation and the restoration of the coupling means may be advantageously effected automatically by a timed control device which is governed by the supply current of the gyroscope motors, thus bringing about a completely automatic operation of the leveling device.

BRIEF DESCRIPTION OF THE DRAWING

The above and other features of my present invention will now be described with reference to the accompanying schematic drawing in which:

FIG. 1 illustrates in a perspective diagram the mechanical suspension of a gyrocompass with a leveling device according to the invention;

FIG. 4 illustrates the shape of a rocking lever, serving as a coupling member, and its relationship with protrusions of the tilt ring, in the normal operating conditions of the gyrocompass;

FIG. 5 illustrates, analogously to FIG. 4, the relationship between the same parts during the passage of the rocking lever from a state of inactivity to its active state;

FIG. 6 illustrates, analogously to FIG. 4, the relationship between the same parts in the coupled condition of the pendular system and the tilt ring.

SPECIFIC DESCRIPTION

Figure 2:
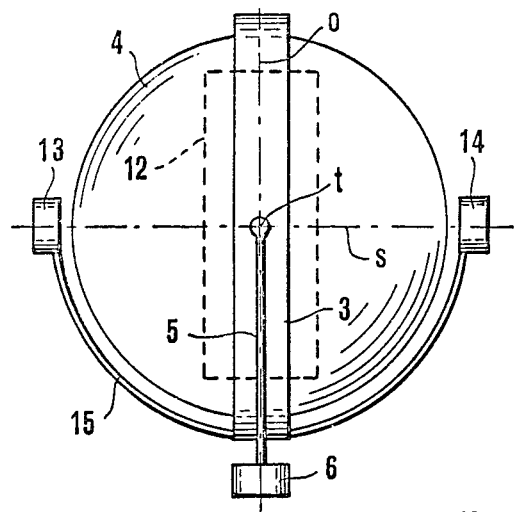
FIG. 2 is a simplified representation of the parts according to the diagram of FIG. 1 as viewed in the direction of the tilt axis, in a state of coupling of its pendular system with its tilt ring.

In FIG. 1 I have shown a supporting fork 1 of a gyrocompass integral with a follower or compass shaft 2 to which are also connected, in a known manner not represented, supporting means, follower-control means and indicating and/or indication-transmitting means. On the supporting fork 1 there is pivoted, for rotation about a tilt axis t, a tilt ring 3 to which, along an orientation axis 0, there is pivoted a gyrosphere 4 within which a gyroscope (not represented) is mounted for rotation around a spin axis s. These arrangements are well known per se in gyrocompasses with mechanical suspension.

Pivotally connected with the supporting fork 1, for rotation about the same tilt axis t, is a fork or U-frame 5 which, together with a weight 6 carried thereon, forms a pendular system. These parts are so dimensioned and arranged as to provide a pendular effect greater than the opposing effect produced by the antipendular precession system installed in known manner on the gyrosphere 4 or on the tilt ring 3 but not represented in FIG. 1.

For the releasable coupling of this pendular system, 5,6 to the tilt ring 3, there is provided a rocking lever 7 which, by means of a rotating magnet 8, may be placed and maintained in an idle position illustrated in FIG. 1, substantially parallel to the spin axis s, and which is urged by a spring, here shown as a spiral 9, to swing in a substantially horizontal plane as indicated by an arrow f until it is substantially parallel to the tilt axis t. Furthermore, the lower part of the tilt ring 3 carries two protrusions 10,11 so located as to lie in the path of the rocking lever 7 and to be engaged by same when the latter rotates according to the arrow f, thus bringing about a consolidation between the pendular system 5,6 and the tilt ring 3.

When this consolidation is effective, as shown in FIG. 2, the pendular mass 6 forces the tilt ring 3 to remain substantially vertical, notwithstanding the countervailing but weaker action of the antipendular system which is here represented by two containers 13 and 14 partially filled with a heavy liquid and interconnected by a U-shaped tube 15 mounted on the tilt ring 3. Thus, the orientation axis 0 of the gyrosphere 4 remains vertical and therefore the spin axis s of the gyroscope, schematically represented by dashed lines 12, remains horizontal.

Figure 3:
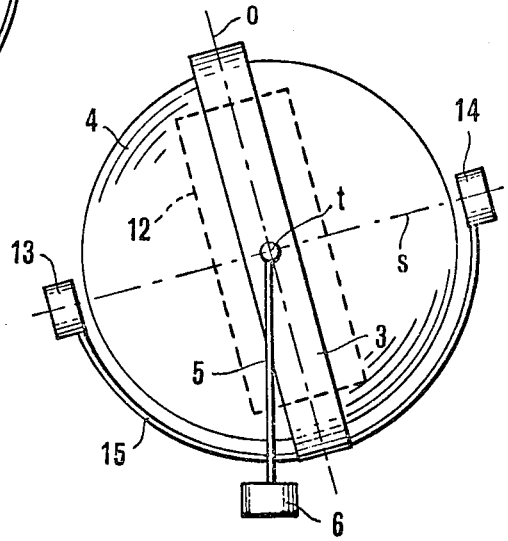
FIG. 3 is a view similar to FIG. 2 but relating to the normal operating conditions of the gyrocompass.

When, instead, the coupling is released, as shown in FIG. 3, the pendular system 5,6 hangs vertical and is affected by the accelerations of the vehicle on which the gyrocompass is mounted, but does not transmit any action to the gyroscopic system controlled by the antipendular system 13,14,15 which is now free to carry on its function and can readily assume the slight inclinations of the spin axis s, with respect to the horizontal plane, that establish the precession motion of the gyroscopic system determining its orientation.

The rocking lever 7 may advantageously be shaped as shown in FIG. 4, with oppositely curved extremities 7′ which, when lever 7 rotates clockwise in the direction of arrow f (FIG. 1) under the action of restoring spring 9, facilitate the engagement with at least one of the protrusions 10 and 11, even if the tilt ring 3 is offset from the pendular fork 5 (FIG. 5), and thus allow the lever 7 to bring the parts into mutual alignment. In the idle position according to FIG. 4 (lever 7 parallel to the spin axis s owing to the action of the rotating magnet 8 against the force of spring 9) the protrusions 10 and 11 may move freely with the tilt ring 3 which carries them, without encountering any hindrance from lever 7. In the working position according to FIG. 6 (lever 7 parallel to the tilt axis t owing to the action of spring 9) the tilt ring 3 with its protrusions 10 and 11 remains solidified with the lever 7 and the pendular fork 5.

Advantageously, lever 7 is also provided with detents 7″, which may be simple elastic tongues which snap in behind the protrusions 10 and 11 to prevent their regression toward the cam-shaped extremities 7′. These detents assure that no accidental action may disengage the tilt ring from the pendular system during the inactivity of compass, so that the normally required caging means may be completely omitted in the construction of the compass.

Figure 7:
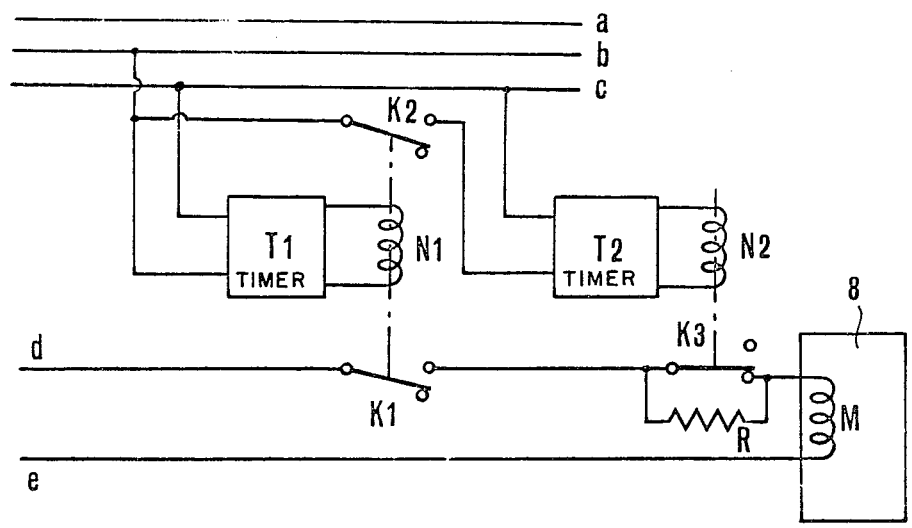
FIG. 7 is a block diagram of an automatic system for the actuation of the coupling means.

The excitation of the rotating magnet 8 could be effected by manual control at the required time, i.e. during a period beginning immediately after the activation of the gyroscope and terminating at an instant approximately corresponding to the end of the activity of the gyroscope motors, yet I prefer to control this excitation automatically, e.g. a simple timing circuit according to FIG. 7. Lines a,b,c represent the triad of leads conventionally feeding the gyroscope motors; they may be supplied, for example, in the usual way by 115-V 400-Hz three-phase voltage during the active periods of the gyrocompass. The winding M of the rotating magnet 8 may be energized by a line d,e, e.g. at a 24-V d-c voltage, through a normally open interrupter contact K1 controlled by an electromagnet N1 whose feed is derived from two leads of the triad a,b,c with interposition of a timing circuit T1. In the energizing circuit for the magnet coil M there is further interposed a normally closed contact K3 shunted by a resistance R and controlled by an electromagnet N2 whose feed is branched off that of the timing circuit T1 through a normally open contact K2, controlled by the electromagnet N1, and through a second timing circuit T2. The timing circuit T1 introduces a first delay which corresponds to the time it takes for the gyroscope of the compass to assume, upon activation, a speed sufficient for the start of the orientation effect. The timing circuit T2 introduces a second delay which corresponds to the time needed by magnet 8 to disengage the projections 10, 11 from the detents 7″ as the lever 7 is swung counterclockwise against the biasing force of spring 9.

In this way, as long as the compass is inactive, no voltage is present on leads a,b,c, the contact K1 is open, the rotating magnet 8 is inactive and the spring 9 maintains the pendular system 5, 6 locked to the tilt ring 3 by means of lever 7 and coacting formations 10, 11. When voltage is applied to the leads a,b,c, the gyroscope motors start, gradually accelerating the gyroscopic mass. As soon as the same has assumed a useful speed, the timer T1 activates the electromagnet N1 by closing the contact K1 and energizes the winding M of the rotating magnet 8 which thereupon displaces lever 7 so as to disengage the tilt ring 3 from the pendular system 5,6; this initiates the orientation of the gyrocompass which starts from a condition with the spin axis s horizontal. Finally, the timer T2 activates the electromagnet N2 which opens the contact K3 and, on account of the resistance R, diminishes the energization of winding M to its holding value in order to reduce its power consumption and the heating thereof.

As soon as the gyrocompass is stopped by interrupting the supply to leads a,b,c, the contact K1 opens, thereby de-energizing the rotating magnet 8 and allowing spring 9 to rotate to lever 7 and to solidify the tilt ring 3 with the pendular system 5,6, in order to prevent any subsequent displacement of the spin axis s from the horizontal plane.

It is to be understood that many modifications may be imparted to the embodiment specifically described. For example, the coupling means and the associated actuating means may be designed differently from the shaped lever 7 and from the rotating magnet 8, and also the formation on the tilt ring 3 which co-operate with the coupling means of the pendular system 5,6 may be different from the protrusions 10 and 11. The fork 5 of the pendular system could be pivoted independently of the tilt ring 3. The tongues or detents 7" may be omitted when the force of the return spring of the coupling means is sufficient by itself to assure the caging effect, or else when the position of the coupling means is maintained in some other way.

I claim:

1. In a gyrocompass comprising a mechanical suspension including a support rotatable about an at least approximately vertical compass axis and a tilt ring pivoted on said support for rotation about an at least approximately horizontal tilt axis, a gyrosphere pivoted on said tilt ring for rotation about an orientation axis perpendicular to said tilt axis, a motor-driven gyroscopic mass mounted within said gyrosphere for rotation about a spin axis perpendicular to said orientation axis, an antipendular-torque precession system mounted on said suspension for oscillation about said spin axis, a pendular system mounted on said suspension for oscillation about said tilt axis, and releasable coupling means for interlocking said pendular system and said tilt ring to override the effect of said precession system during periods of standstill of the gyroscope, the improvement wherein said coupling means comprises a rocking lever carried on said pendular system, actuating means for swinging said rocking lever in a substantially horizontal plane between an idle position and a working position, and coacting means on said tilt ring engageable by said rocking lever in said working position for immobilizing said tilt ring relatively to said pendular system.

2. The improvement defined in claim 1 wherein said rocking lever is provided with a pair of oppositely curved extremities, said coacting means comprising a pair of protrusions on said tilt ring respectively engageable by said extremities for forcibly aligning said tilt ring with said rocking lever upon a swinging of the latter into said working position.

3. The improvement defined in claim 2 wherein said extremities are provided with detents for retaining said protrusions in a position of alignment of said tilt ring with said rocking lever.

4. The improvement defined in claim 3 wherein said detents are a pair of elastic tongues.

5. The improvement defined in claim 1, 2, 3 or 4 wherein said actuating means comprises an electromagnetic coil energizable to swing said rocking lever into said idle position against the force of a restoring spring biasing same into said working position.

6. In a gyrocompass comprising a mechanical suspension including a support rotatable about an at least approximately vertical compass axis and a tilt ring pivoted on said support for rotation about an at least approximately horizontal tilt axis, a gyrosphere pivoted on said tilt ring for rotation about an orientation axis perpendicular to said tilt axis, a motor-driven gyroscopic mass mounted within said gyrosphere and provided with electric drive means for rotating same about a spin axis perpendicular to said orientation axis, an energizing circuit for said drive means connectable to a voltage source, an antipendular-torque precession system mounted on said suspension for oscillation about said spin axis, a pendular system mounted on said suspension for oscillation about said tilt axis, releasable coupling means for interlocking said pendular system and said tilt ring to override the effect of said precession system during periods of standstill of the gyroscope, and actuating means controlled by said energizing circuit for disconnecting said pendular system from said tilt ring during periods of normal operation of said gyrosphere, the improvement wherein said actuating means comprises an electromagnetic coil for displacing said coupling means from an engagement position into a disengagement position against a restoring force, first timing means connected to said energizing circuit for supplying said coil with enough operating current to overcome said restoring force after a first delay following a start-up of said drive means sufficient to accelerate same to a predetermined speed, and second timing means responsive to said first timing means for reducing the intensity of said operating current to a holding level after a second delay sufficient to let said coupling means leave said engagement position.

7. The improvement defined in claim 6 wherein said coupling means comprises a swingable member provided with detent means tending to maintain same in said engagement position.

* * * * *